United States Patent [19]
Yagi et al.

[11] Patent Number: 5,472,079
[45] Date of Patent: Dec. 5, 1995

[54] METHOD AND APPARATUS FOR CONTROLLING THE DRIVE OF SELF-EXCITED VIBRATING PARTS FEEDER

[75] Inventors: Susumu Yagi; Shunriki Nin, both of Toyama, Japan

[73] Assignee: Yoshida Kogya K.K., Tokyo, Japan

[21] Appl. No.: 261,199

[22] Filed: Jun. 16, 1994

[30] Foreign Application Priority Data

| Jun. 16, 1993 | [JP] | Japan | 5-144479 |
| Jun. 16, 1993 | [JP] | Japan | 5-144480 |
| Mar. 3, 1994 | [JP] | Japan | 6-033311 |
| Mar. 3, 1994 | [JP] | Japan | 6-033312 |

[51] Int. Cl.$^6$ .................................................. B65G 27/32
[52] U.S. Cl. ............................. 198/162; 198/756
[58] Field of Search ........................... 198/750, 751, 198/752, 757, 762, 769, 770

[56] References Cited

U.S. PATENT DOCUMENTS

| 3,716,130 | 2/1973 | Morris | 198/762 |
| 4,216,416 | 8/1980 | Grace | 198/762 X |
| 4,331,263 | 5/1982 | Brown | 222/63 |
| 4,811,835 | 3/1989 | Bullivant et al. | 198/762 |
| 4,921,090 | 5/1990 | Gregor | 198/769 X |
| 5,074,403 | 12/1991 | Myhre | 198/751 |

FOREIGN PATENT DOCUMENTS

| 0432881 | 6/1991 | European Pat. Off. | |
| 0244810 | 10/1987 | Japan | 198/762 |
| 0235115 | 10/1987 | Japan | 198/762 |

*Primary Examiner*—James R. Bidwell
*Attorney, Agent, or Firm*—Hill, Steadman & Simpson

[57] ABSTRACT

A drive control method for a self-excited vibrating parts feeder which includes a parts feeder unit and a drive power supply for supplying an electric power of a desired frequency to an electromagnetic vibration generating unit to exert vibrations to the parts feeder unit, the method comprising the steps of: sweeping the voltage of the drive power supply through a predetermined frequency range; detecting a maximum value of a change in the current flowing through an exciting coil of the electromagnetic vibration generating unit while the voltage of the drive power supply is swept; driving the parts feeder at a frequency which generates said maximum value; comparing a current varying within the predetermined frequency range with a predetermined current; and controlling a drive current of the drive power supply so that the varying current and the predetermined current are identical, thereby controlling the vibration amplitude. The parts feeder is always driven at a resonant frequency and with a constant vibration amplitude, without providing a detector mounted on the parts feeder body and without presetting a natural frequency at the time of manufacture of the parts feeder.

13 Claims, 13 Drawing Sheets

METHOD AND APPARATUS FOR CONTROLLING THE DRIVE OF SELF-EXCITED VIBRATING PARTS FEEDER

BACKGROUND OF THE INVENTION

1. Field of the Invention

The present invention relates to a method of and an apparatus for controlling the drive of a parts feeder to feed a number of parts in succession along a part feed track in a parts feed unit by exerting vibration to the parts feed unit using electromagnetic vibration or piezoelectric vibration. More particularly, the invention is concerned with control method and apparatus for a self-excited vibration parts feeder, which is able to drive a parts feed unit in a controlled manner at a resonance frequency without the necessity of providing a particular detecting device mounted on the parts feed unit.

2. Description of the Prior Art

A typical example of parts feeder of the type using electromagnetic vibration includes a bowl having a spiral parts feed track. Briefly stated, the spiral parts feed track is provided on the inside surface of a side wall of the bowl, and the bowl is provided with an attractable member attached to the underside of a bottom wall of the bowl. The attractable member is supported on upper ends of a plurality of spring members, the lower ends of the spring members being secured to a base, with a predetermined angle formed between each of the spring members and the base. The base supports on its upper surface an electromagnet which operates to intermittently pull or attract the attractable member, thereby exerting vibration to the bowl. The base is fixedly mounted on a floor surface via a suitable support member having a cushioning or damping action, such as rubber.

On the other hand, a typical example of parts feeder of the type using piezoelectric vibration includes a bowl having the same construction as the bowl described above, and a plurality of pairs of spring members and piezoelectric elements directly connected together. The pairs of spring members and piezoelectric elements are attached at their upper end lower ends to the bowl and a base, respectively, with an angle formed between each pair of spring member and piezoelectric element and the base.

The above-mentioned parts feeders are driven when the electromagnet or the piezoelectric elements are caused to vibrate by an electric power having a constant frequency (driving frequency). To improve the driving efficiency, a mechanical system is so designed as to have a natural frequency which is resonant with the driving frequency. However, in the parts feeder the natural frequency and amplitude of vibration of the mechanical system are greatly influenced by various factors, such as the bowl, resilient legs, base and support member. In addition, a body of the parts feeder has many uncertain factors. Accordingly, the natural frequency of the parts feeder is difficult to identify. Furthermore, the natural frequency is variable with a change in the weight of parts to be fed and also with a change in the ambient temperature. Under these circumstances, the natural frequency gradually deviates from the driving frequency as the time goes on. It is, therefore, almost impossible to keep the parts feeder driving in a resonating state with a stable vibration amplitude.

The change in the natural frequency and amplitude of vibration of the mechanical system brings about a disturbance in the conveyance of the parts and sometimes slows or interrupts the supply of the parts. Such an interruption of the supply of the parts lowers the amount of parts supplied from the parts feeder, increases a downtime of the parts feeder, and considerably lowers the operation rate of the parts feeder. To avoid this, the operator must endeavor to keep smooth supply of the parts by repeating a tedious adjustment of the parts feeder many times a day. On the other hand, fluctuation of a source voltage is not negligible and exerts a delicate influence on the vibration of the bowl.

In order to overcome the foregoing difficulties, there has been proposed a parts feeder controller such as disclosed in Japanese Patent Laid-Open Publication No. Sho 57-27808. The disclosed parts feeder controller seeks to control the drive of the parts feeder such that the vibration amplitude of an electromagnet is kept always constant to feed the parts in a stably manner regardless of fluctuation of the source voltage or a change in the amount of parts held in the bowl. To this end, the parts feeder controller includes a photoelectric transducer composed of a light projector and a light-sensitive detector arranged in alignment with each other so that light emitted from the light projector toward the light-sensitive detector passes through an air gap between a fixed iron-core and a movable iron-core of the electromagnet. The photoelectric transducer converts a change in the quantity of light passing through the air gap into a current value to detect an amplitude of vibration of the electromagnet. A signal current representing the detected vibration amplitude is fed back to a vibration amplitude control circuit to regulate by phase control the magnitude of current flowing through the electromagnet so that the vibration amplitude of the electromagnet is kept always constant.

Another parts feeder controller disclosed in Japanese Patent Publication No. Sho 52-40118, for example, includes a vibrating condition detector attached to a resilient leg supporting a parts feeder unit. The detector electrically detects the amount of deformation of the resilient leg caused by vibration of a bowl. A signal from the detector is fed back to a power amplifier of a drive unit to cause self-excited oscillation so that the driving frequency is identical to a natural frequency of a mechanical system. The signal from the detector is also used to vary the pulse duration of a current flowing through a drive coil for controlling a driving force in order to keep the amplitude of vibration constant.

The above-mentioned parts feeder controllers each have a detector mounted on the body of the parts feeder exclusively for a purpose of detecting the vibrating condition. The detector thus arranged is not free from damage, may be affected by ambient conditions according to the type used, and generally requires high mounting accuracy.

To eliminate these adverse effects, and regarding resonant frequencies, in particular, it has been conventional practice to preset a natural frequency of a mechanical system when the parts feeder is manufactured. However, there is not much point in presetting the natural frequency because the natural frequency is readily influenced by various factors stated above and also variable as the time goes on.

SUMMARY OF THE INVENTION

It is accordingly an object of the present invention to provide a method of and an apparatus for controlling the drive of a self-excited vibration parts feeder so that the parts feeder can be always driven at a resonant frequency and with a constant vibration amplitude by virtue of a follow-up control achieved in the apparatus, without providing a particular detector mounted on a body of the parts feeder and without presetting a natural frequency at the time of manufacture of the parts feeder.

Through earnest investigations and experiments made repeatedly, the present inventors found that when the frequency of an alternating (AC) voltage of a sinusoidal waveform applied to an electromagnetically vibrating parts feeder is varied, the current value shows a local change near a resonant frequency, and that the current value varies with the amount of works or parts held in the bowl, with a particular correlation established between the current value and the parts weight. A further investigation verified that the foregoing phenomenon appears more clearly in the case of the frequency component of the third order which has a power spectrum three times larger than the power spectrum of a fundamental frequency of the applied voltage.

The present inventors came to a conclusion with full confidence that a proper use of the foregoing phenomenon makes it possible to realize novel controlling method and apparatus which is able to control the drive of a parts feeder at a resonant frequency and with a constant amplitude of vibration, without using an exclusive detector mounted on a body of the parts feeder.

In one aspect the present invention provides a method of controlling the drive of a self-excited vibrating parts feeder which includes a parts feeder unit and a drive power supply for supplying an electric power of a desired frequency to a vibration generating unit to exert vibrations to the parts feeder unit, the method comprising the steps of: sweeping the voltage of the drive power supply through a predetermined frequency range; detecting a maximum value of a change in the current flowing through the vibration generating unit, while the voltage of the drive power supply is swept; and driving the parts feeder with a frequency which generates said maximum value. The method may further include a step of comparing a current varying within the predetermined frequency range with a predetermined current, and a step of controlling a drive current of the drive power supply so that the varying current and the predetermined current are identical, thereby controlling the amplitude of vibration of the parts feeder.

The vibration generating unit may be an electromagnetic driving unit including an iron-core coil and an armature, or a piezoelectric driving unit including a piezoelectric element. Preferably, the current from which said maximum value is detected is a harmonic component that results from vibration of a mechanical system of the parts feeder.

In another aspect the invention provides an apparatus for controlling the drive of an electromagnetic vibration parts feeder of the type including a parts feeder unit, an electromagnetic driving unit having an iron-core coil and an armature for exerting vibration to the parts feeder unit, and a drive power supply for supplying an electric power of a desired frequency to the electromagnetic driving unit, the apparatus comprising: a current detecting means for detecting a current flowing through the iron-core coil; and a drive signal generating means for sweeping the voltage of the drive power supply through a predetermined frequency range, detecting a change in the current flowing through the iron-core coil while the voltage of the drive power supply is swept, determining a frequency corresponding to a maximum value of the current change, and driving the drive power supply at the thus-determined frequency.

In yet another aspect the invention provides an apparatus for controlling the drive of a piezoelectric vibrating parts feeder at a resonance frequency, of the type including a parts feeder unit, a piezoelectric driving unit having a piezoelectric element for exerting vibration to the parts feeder unit, and a driving power supply for supplying an electric power of a desired frequency to the piezoelectric driving unit, the apparatus comprising: a current detecting means for detecting a current flowing through the piezoelectric element; and a drive signal generating means for sweeping the voltage of the drive power supply through a predetermined frequency range, detecting a change in the current flowing through the piezoelectric element while the voltage of the drive power supply is swept, determining a frequency corresponding to a maximum value of the current change, and driving the drive power supply at the thus-determined frequency.

The apparatus provided in either aspect of the invention may further include an oscillating current computing means for computing, by comparison, the difference between the value of the current detected by the current detecting means and the value of a preset current signal which is previously set to produce a predetermined amplitude, and an exciting current driving means for controlling a driving current of the drive power supply according to the result of that computation so that the value of the detected current and the value of the preset current signal are identical.

Preferably, the apparatus further includes a harmonic analyzing means, disposed between the current detecting means and the drive signal generating means, for separating the current detected by the current detecting means into components of different frequencies and inputting to the drive signal generating means a current signal including a harmonic component that results from vibration of the parts feeder.

The apparatus may further include a sampling measurement means, disposed between the current detecting means and the harmonic analyzing means, for sampling the current detected by the current detecting means at predetermined intervals of time and sending the sampled current to the harmonic analyzing means.

The phenomenon previously mentioned will be further described below using concrete data. A theoretical support of the phenomenon will be also analyzed below using a model.

Referring now to FIGS. 5, 6 and 10, description will be first given of a change in the current observed when the frequency of a source voltage is varied from 43 to 63 Hz. FIGS. 5 and 6 respectively show a current versus frequency characteristic curve and a vibration amplitude versus frequency characteristic curve of an electromagnetically vibrating parts feeder. As understood from FIG. 5, an effective value of the current, a first order current based on the source voltage, and a third order current based on vibration of the parts feeder each show a tendency to decrease with an increase of the frequency. The first order and third order current values represent those values obtained by subjecting actual current values to a frequency analyzing process using an FFT (fast Fourier transform) analyzer. The first order current has a power spectrum which is one time, or the same as, that of the frequency specified above, and the third order current has a power spectrum which is three times larger than that of the frequency specified above. FIG. 10 shows a second order current versus frequency characteristic curve of a piezoelectrically vibrating parts feeder. As evidenced from FIG. 10, the second order current shows a tendency to progressively increase with an increase of the frequency.

In FIG. 5, a careful examination of the effective values will find the fact that the current values slightly increase at frequencies around 59 Hz. Referring now to the first and third order current values, a great local change is confirmed at prequencies around 59 Hz. The local change appearing in the third order current values is particularly remarkable. Although a theoretical consideration has not been given to this phenomenon, it is assumed that when a source voltage applied to a parts feeder has a prequency identical to a natural frequency of the parts feeder, a current component resulting exclusively from vibration of the parts feeder is generated separately from a current component caused by application of the source voltage; the vibration-induced current component is added to the current component corresponding to the applied source voltage and when the resonance takes place, the current value changes greatly, as shown in FIG. 5.

FIG. 6 shows an effective value of an amplitude which is variable with the frequency. As is apparent from FIG. 6, the amplitude takes a maximum value when the frequency is about 59 Hz. This means that the frequency at which the current takes a maximum value is a resonance point or frequency.

This phenomenon appears also in the case of the piezo-electrically vibrating parts feeder, as suggested by a characteristic curve shown in FIG. 10. From FIG. 10 it will be understood that as the frequency increases, the second order current progressively and linearly increases except for a sharp raise at frequencies around 145 Hz. Though not shown, an experiment made in the same manner as shown in FIG. 6 proved that the amplitude has a maximum value when the frequency is about 145 Hz, and the frequency at which the current takes a maximum value is a resonance point or frequency.

From the foregoing experimental results it is understood that a resonance frequency of a parts feeder can be identified by finding out a change in the current occurring when the frequency of a source voltage is swept, and more particularly finding out a point at which a third order component of the current takes a maximum value during the sweep, without presetting the natural frequency at the time of manufacture of the parts feeder.

Then, the correlation between the weight of parts and the effective value of amplitude, the correlation between the parts weight and the current, and a correlation between the amplitude and the current observed when the weight of parts is changed will be described below with reference to FIGS. 7–9 and 11. FIGS. 7–9 show vibration characteristics of the electromagnetically vibrating parts feeder, and FIG. 11 shows a vibration characteristic of the piezoelectrically vibrating parts feeder.

As shown in FIG. 7, the amplitude represented in terms of effective value (mV) sharply decreases with an increase of the parts weight (g). FIG. 8 indicates that the current (mA) progressively decreases with an increase of the parts weight (g). A third order component of the current progressively decreases at a rate which is smaller than those of an effective value and a first order component of the current. The third order current component has a characteristic curve which approaches a straight line as the parts weight increases. These data can be used to prepare current versus amplitude curves shown in FIG. 9 which represent the correlation between the current and amplitude observed when the parts weight is varied. As shown in FIG. 9, the third order current component varies substantially linearly at a greater rate than the effective value of the current and the first order current component. This holds good for the piezoelectrically vibrating parts feeder, too, as shown in FIG. 11. This means that if a current is detected and an automatic feed-back control is achieved with respect to the detected current, the parts feeder can be always driven at a constant amplitude regardless of the change of the parts weight. In this instance, the current to be detected is the third order current when the electromagnet is used. Alternately, when the piezoelectric element is used, the current to be detected is a second order current.

The above-mentioned correlated characteristics of the amplitude and current will be theoretically analyzed using an electrical and mechanical model of the electromagnetically vibrating parts feeder shown in FIG. 12. Reference characters used in FIG. 12 are as follows.

| V(t): applied voltage, | K: spring constant, |
|---|---|
| i(t): current, | C: damping constant, |
| R: coil resistance, | $S_1$, $S_2$: cross-sectional area, |
| N: number of turns, | $1_1$, $1_2$: length of path, |
| m: bowl weight, | $\mu_1$, $\mu_2$: relative permeability |
| δ: air gap, | |

Assuming that the weight of a base of the parts feeder is much larger than the bowl weight, the following analysis takes into consideration of forced vibration in a system having one degree of freedom.

(I) Relation between the magnitude of air gap δ a the self-inductance L

The analysis begins with due consideration of the fact that the magnitude of air gap δ and the self-inductance L are variable.

In a magnetic circuit shown in FIG. 12, the magnetic resistance (coil resistance) R can be expressed as:

$$R = \frac{2\delta}{\mu_0 S_2} + \frac{1_1}{\mu_0 \mu_1 S_1} + \frac{1_2}{\mu_0 \mu_1 S_2} \quad (1)$$

On the other hand, $$N\phi = Li(t) \quad (2)$$

(where $\phi$: magnetic flux and L: self-inductance)

$$Ni(t) = \phi R \quad (3)$$

From the relation stated above, the self-inductance L can be expressed as:

$$L = \frac{N^2}{R} = \frac{N^2}{\frac{2\delta}{\mu_0 S_2} + \frac{1_1}{\mu_0 \mu_1 S_1} + \frac{1_2}{\mu_0 \mu_1 S_2}} \quad (4)$$

(II) Analysis of the full-wave type parts feeder

Now, when a sine wave $V(t) = E_0 \sin \omega t$ is applied, the current i(t) can be expressed as:

$$i(t) = \frac{E_0}{\sqrt{R^2 + W^2 L^2}} \sin(Wt + \phi_1) \quad (5)$$

(where $\phi_1$: phase lag relative to voltage)

If R<<ωL, Equation (5) can be written as:

$$i(t) = \frac{E_0}{WL} \sin(Wt + \phi_1) \quad (5')$$

Substituting Equation (4) for L in Equation (5') and rearranging the result of substitution, we have $$i(t) = \left( \frac{\delta}{\mu_0 S_2} + \frac{l_1}{\mu_0\mu_1 S_1} + \frac{l_2}{\mu_0\mu_2 S_2} \right) \times \frac{E_0}{WN^2} \sin(Wt + \phi_1) \quad (6)$$

Assuming that vibration of the mechanical system has a single frequency, the air gap $\delta$ may be considered to be expressed as:

$$\delta = \delta_0 + \delta_1 \sin(2\omega t + \phi_2) \quad (7)$$

In Equation (7) the frequency is two times as large as the fundamental frequency because the electromagnet undertakes an attracting action either when the current direction is positive or when the current direction is negative. This is evidenced by the fact that the full-wave type parts feeder oscillates or vibrates at 120 Hz when excited by a commercial power supply of 60 Hz. $\phi_2$ is a phase lag relative to the exciting force $F = F_0 \sin \omega t$. It is known that the phase lag $\phi_2$ has a characteristic as shown in FIG. 13.

The magnitude of amplitude $\delta_1$ is expressed as:

$$\delta_1 = \frac{F_0/m}{\sqrt{\left(\frac{K^2}{m^2} - 4W^2\right)^2 + \frac{4c^2 W^2}{m^2}}} \quad (8)$$

In the case of the parts feeder, the amplitude $\delta_1$ generally has a characteristic curve shown in FIG. 14.

Substituting Equation (7) for Equation (6) and rearranging the result of substitution, we have $$i(t) = \left( \frac{\delta_0}{\mu_0 S_2} + \frac{l_1}{\mu_0\mu_1 S_1} + \frac{l_2}{\mu_0\mu_2 S_2} \right) \times \frac{E_0}{WN^2} \sin(Wt + \phi_1) + \quad (9)$$

$$\frac{\delta_1 \sin(2Wt + \phi_2)}{\mu_0 S_2} \times \frac{E_0}{WN^2} \sin(Wt + \phi_1)$$

It should be noted that the first term of Equation (9) represents the current not related to vibration, while the second term represent the current related to vibration.

Let the current related to vibration to be id(t), the second term of Equation (9) may be deformed as:

$$id(t) = \quad (10)$$

$$\frac{\delta_1 E_0}{2\mu_0 S_2 WN^2} \{\cos(Wt - \phi_1 + \phi_2) - \cos(3Wt + \phi_1 + \phi_2)\}$$

It appears clear from Equation (10) that in the full-wave parts feeder, the current flows at two different frequencies which are respectively one time and three times as large as the fundamental frequency, and that the current is proportional to the amplitude. The current component with one time frequency (first order frequency) is absorbed by the current flowing through the coil. However, the current component with three times frequency (third order frequency) shows a great change relative to a change of the amplitude. This result of analysis agrees with the experimental result previously mentioned.

An analysis made on a half-wave type parts feeder showed the same result as described above with the exception that the current flows at a frequency which is two times as large as the fundamental frequency and which is proportional to the amplitude. This result of analysis agrees with the experimental result.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1B:
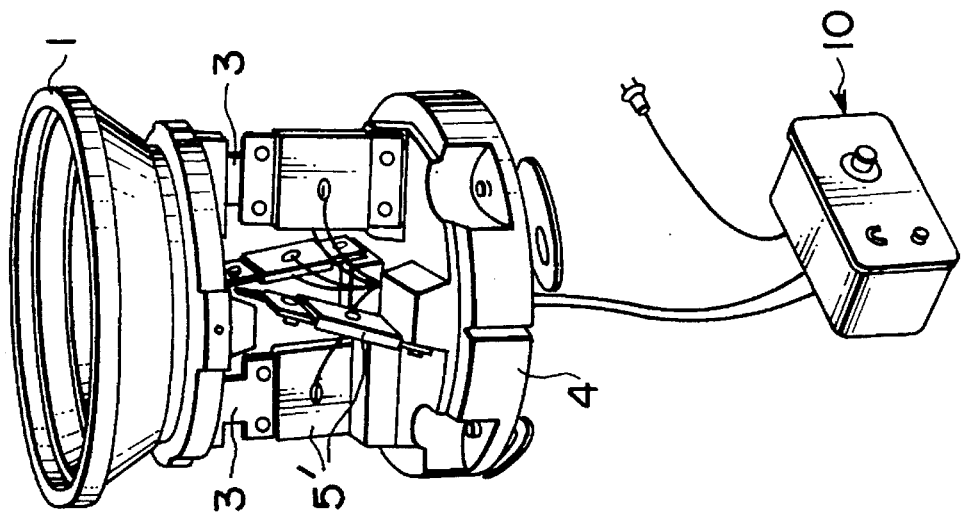
FIG. 1B is a diagrammatical perspective view of a piezoelectrically vibrating parts feeder in which the controller is incorporated.

Certain preferred embodiments of the present invention will be described below in greater detail with reference to the drawings, wherein like reference characters designate like or corresponding parts throughout the several views. FIG. 1A diagrammatically shows one example of electromagnetically vibrating parts feeder including a controller 10 according to the present invention. The parts feeder is substantially the same in construction as the conventional parts feeder. Briefly stated, the parts feeder includes a parts feeder unit 1 composed of a bowl having a spiral parts feed track and an attractable member 2 attached to the underside of the bowl. The parts feeder unit 1 is supported by a plurality of plate springs 3 via the attractable member 2 such that a predetermined angle is formed between the underside of the parts feeder unit 1 and each of the plate spring 3. The plate springs 3 are secured at their upper ends to the attractable member 2, the lower ends of the respective plate springs 3 being secured to a base portion 4 such that the base portion 4 and each of the plate spring 3 jointly form the same angle as described above. The base portion 4 supports on its upper surface an electromagnetic drive unit composed of an electromagnet 5 including an iron-core coil and an armature. The electromagnet 5 forms a vibration generating unit. When an electric power from a power supply is intermittently supplied to the electromagnet 5, the electromagnet 5 intermittently attracts or pulls the attractable member 2, thus exerting vibration to the parts feeder unit 1. The base portion 4 is fixedly mounted on a floor surface via a cushioning or damping member 6 made of rubber, for example.

Figure 1A:
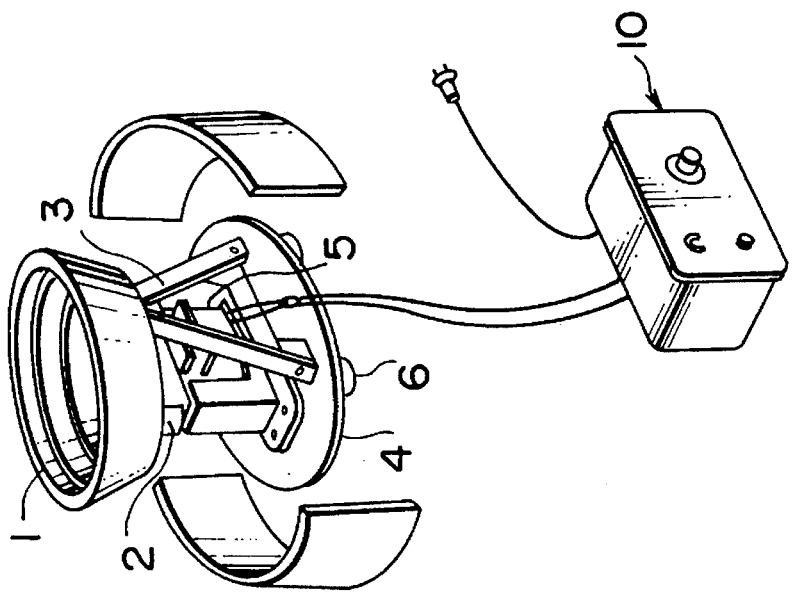
FIG. 1A is a partly exploded diagrammatical perspective view of an electromagnetically vibrating parts feeder incorporating a controller according to the present invention.

FIG. 1B illustrates the general construction of a piezoelectric vibrating type parts feeder incorporating the controller 10 according to the present invention. The parts feeder includes a parts feeder unit 1 composed of a bowl having a spiral parts feed track, and a plurality of plate springs 3 attached at their upper ends to the underside of the parts feeder unit with a predetermined angle formed therebetween. The lower ends of the respective plate springs 3 are directly connected to the upper ends of the corresponding piezoelectric elements 5'. The lower ends of the piezoelectric elements 5' are secured to a base portion 4 at the same angle as the upper ends thereof. The piezoelectric elements 5' oscillate when an electric power from a power supply is intermittently supplied to the piezoelectric elements 5'. The oscillation or vibration of the piezoelectric elements 5' is transmitted via the plate springs 3 to the parts feed unit 1. The base portion 4 is fixedly mounted on the floor surface via a cushioning or damping member 6. The piezoelectric elements 5' jointly form a piezoelectric drive element which constitutes a main portion of a vibration generating unit.

The controller 10 according to the invention is so constructed as to controllingly drive the parts feeder at a resonant frequency and simultaneously control the amplitude at a constant level. However, the primary controlled object of the present invention is the frequency so that any other suitable means may be employed to perform the amplitude control operation.

Figure 2:
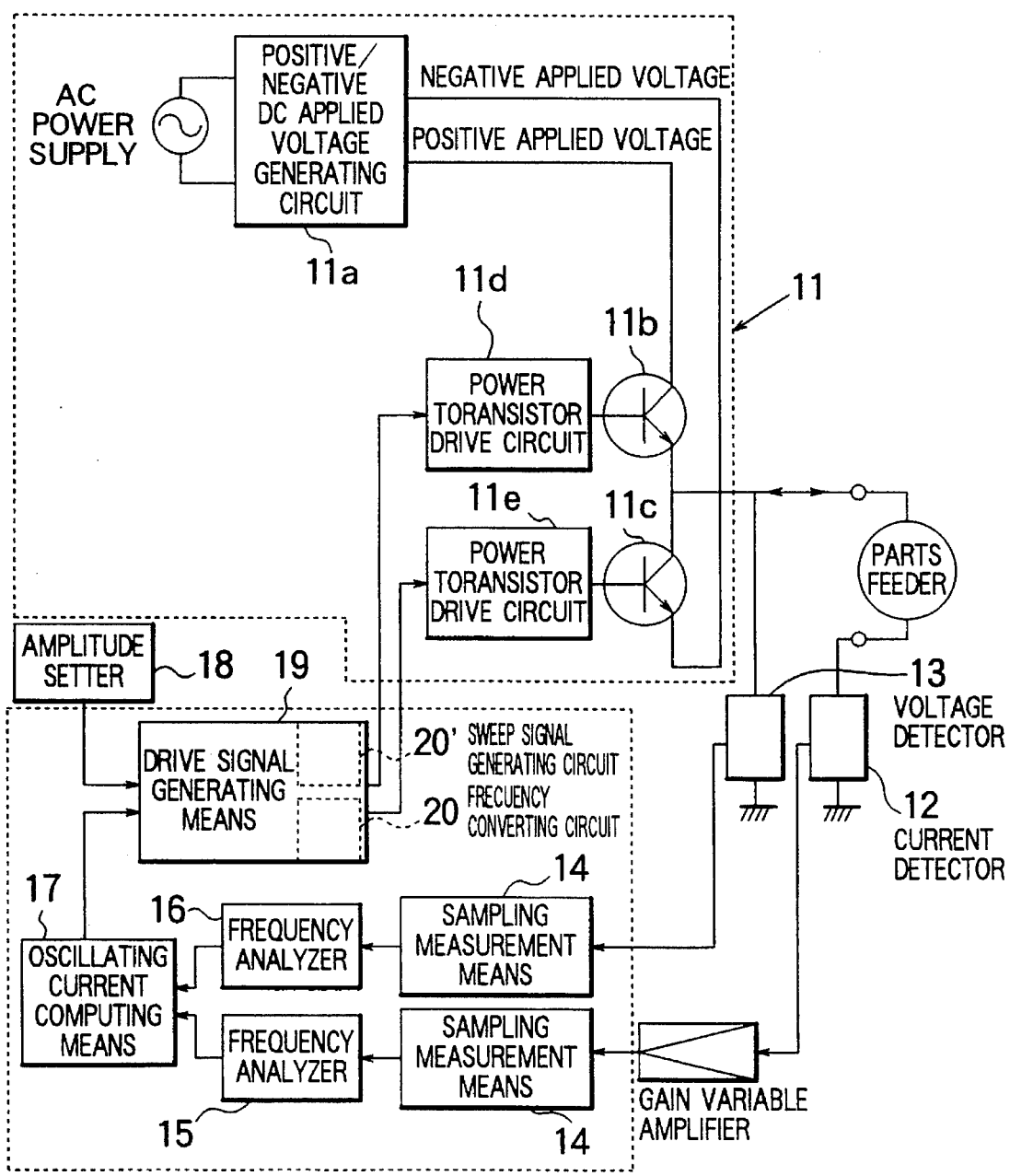
FIG. 2 is a block diagram of a control circuit incorporated in a body of the controller.

The controller 10 shown in FIG. 1A includes, as shown in FIG. 2, a power circuit (drive power supply) 11 for exciting the electromagnet (designated at 5 in FIG. 1A), a current detecting means or detector 12 for detecting a current flowing through an exciting coil of the electromagnet, a voltage detecting means or detector 13 for detecting a voltage applied to the parts feeder, a pair of sampling measurement means or devices 14, 14 for measuring by sampling the current and voltage, respectively, at equal time intervals, a first frequency analyzing means or analyzer 15 for analyzing or separating the current into different frequency components, a second frequency analyzing means or analyzer 16 for analyzing or separating the voltage into different frequency components, an oscillating current computing means or unit 17 for comparing a harmonic component of each of the applied voltage and the current analyzed by the frequency analyzers 15, 16, to extract the harmonic component of the current resulting from vibration of a mechanical system, an amplitude setter 18 having a preset current value corresponding to an appropriate amplitude of vibration of the parts feeder, a drive signal generating means or generator 19 for finding out or determining a resonant frequency based on a maximum value of the harmonic component appearing during the sweep of the frequency and comparing the harmonic component of the current extracted by the oscillating current computer 17, with the preset current value set by the amplitude setter 18, so as to control the drive current according to the result of the comparison previously stated.

In case of the piezoelectrically vibrating parts feeder, the power circuit 11 is replaced with another power circuit suitable for use with the piezoelectric elements. In addition, the current detector 12 is replaced with a current detector which is capable of detecting the current supplied to the piezoelectric elements. Other structural details are substantially the same as those shown in FIG. 2.

The description given below is essentially direction to the electromagnetic vibrating parts feeder shown in FIG. 1A.

As shown in FIG. 2, the power circuit 11 has a main portion composed of a positive/negative DC applied voltage generating circuit 11a for converting an AC voltage in a commercial AC power supply to positive and negative DC voltages, a first power transistor 11b having a collector connected to a positive voltage output end of the positive/negative DC applied voltage generating circuit 11a, and a second power transistor 11c having an emitter connected to a negative voltage output end of the positive/negative DC applied voltage generating circuit 11a. The emitter of the first power transistor 11b and the collector of the second power transistor 11c are connected to an input end of the exciting coil of the parts feeder. The bases of the first and second power transistors 11b, 11c respectively are connected to positive and negative input ends of the drive signal generator 19 via a pair of power transistor drive circuits 11d and 11e. The power transistors 11b, 11c constitute an exciting current driving means.

Figure 3:
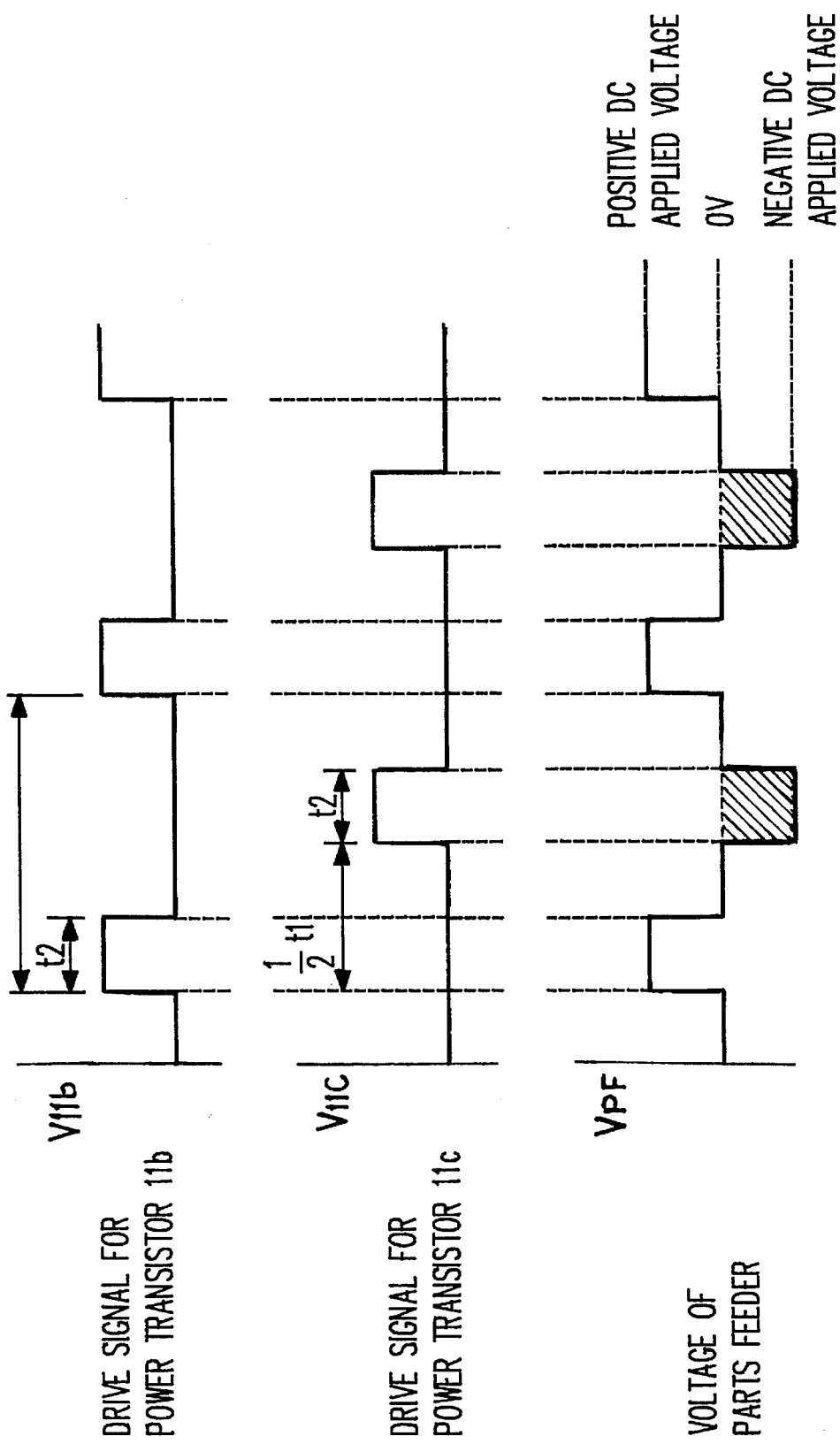
FIG. 3 is a view showing one example of waveform of a drive voltage created by a power circuit of the invention for driving the parts feeder.

The positive/negative DC applied voltage generating circuit 11a operates, for a purpose of applying an AC voltage from the AC power supply to the parts feeder, to first convert the AC voltage to positive and negative DC voltages, and then supply the DC voltages to the first and second power transistors 11b, 11c, respectively. Two waveforms of the applied voltages outputted from the first and second power transistors 11b, 11c are combined together and the resulting composite waveform is outputted to the exciting coil of the parts feeder as a square AC waveform having a constant peak-to-peak value and predetermined duration t1 and width t2, as shown in FIG. 3. Thus, in this embodiment, AC in a commercial AC power supply is converted into DC, and after that the DC is converted by an inverter into AC having a square waveform. This arrangement is employed for the reason that in terms of the easiness of signal analysis and the accuracy of control, the square wave is not superior to the sine wave, however, an exact sine wave can only be realized with considerable difficulties and substantial increase in cost. The waveform shown in FIG. 3 is of the full-wave driving type. In the case of a waveform of the half-wave driving type, these parts of the waveform which are indicated by hatching shown in FIG. 3 are omitted.

The current detector 12 detects a current flowing through the exciting coil and may be a known detecting circuit having an extremely low impedance. The voltage detector 13 detects an applied voltage of the parts feeder, which voltage has a waveform so shaped as described above. The voltage detector 13 may be a known detecting circuit.

The sampling measurement device 14 converts analog signals detected by the current detector 12 and the voltage detector 13, into digital signals through a sampling process taken at equal time intervals. The digital signals thus converted are supplied to the frequency analyzers 15, 16.

The frequency analyzers 15, 16 separate the voltage and current, respectively, into harmonic components using the Fourier transform, and analyze the harmonic components on the frequency basis. In general, the applied voltage per se contains a harmonic component and, hence, the current is influenced by the harmonic component. The influence exerted by the applied voltage cannot be eliminated only by separating the harmonic components of the current. In view of this difficulty, according to the illustrated embodiment, the voltage and current are analyzed for each frequency component to extract these harmonic components which are caused exclusively by a mechanical system. With this extraction, it is possible to eliminate the influence caused by the harmonic component. By the analysis third order current component resulting from vibration of the parts feeder and the harmonic components of the applied voltage are extracted. Then, the oscillating current computer 17 subtracts or removes the harmonic components of the applied voltage from the third order current component, thereby extracting the harmonic component caused by vibration of the parts feeder.

The drive signal generator 19 has an operation circuit (not shown) which compares the harmonic component of the current extracted by the oscillating current computer 17 with a current value set in the amplitude setter 18 to control the drive current according to the result of comparison. The drive signal generator 19 further includes a sweep signal generating circuit 20' for measuring a change in the exciting current occurring when the frequency of the applied voltage is changed in a predetermined range, and a frequency converting circuit 20 for finding out a maximum value of the current change or fluctuation measured during the sweep so as to drive the parts feeder with a frequency corresponding to the maximum value.

Figure 4:
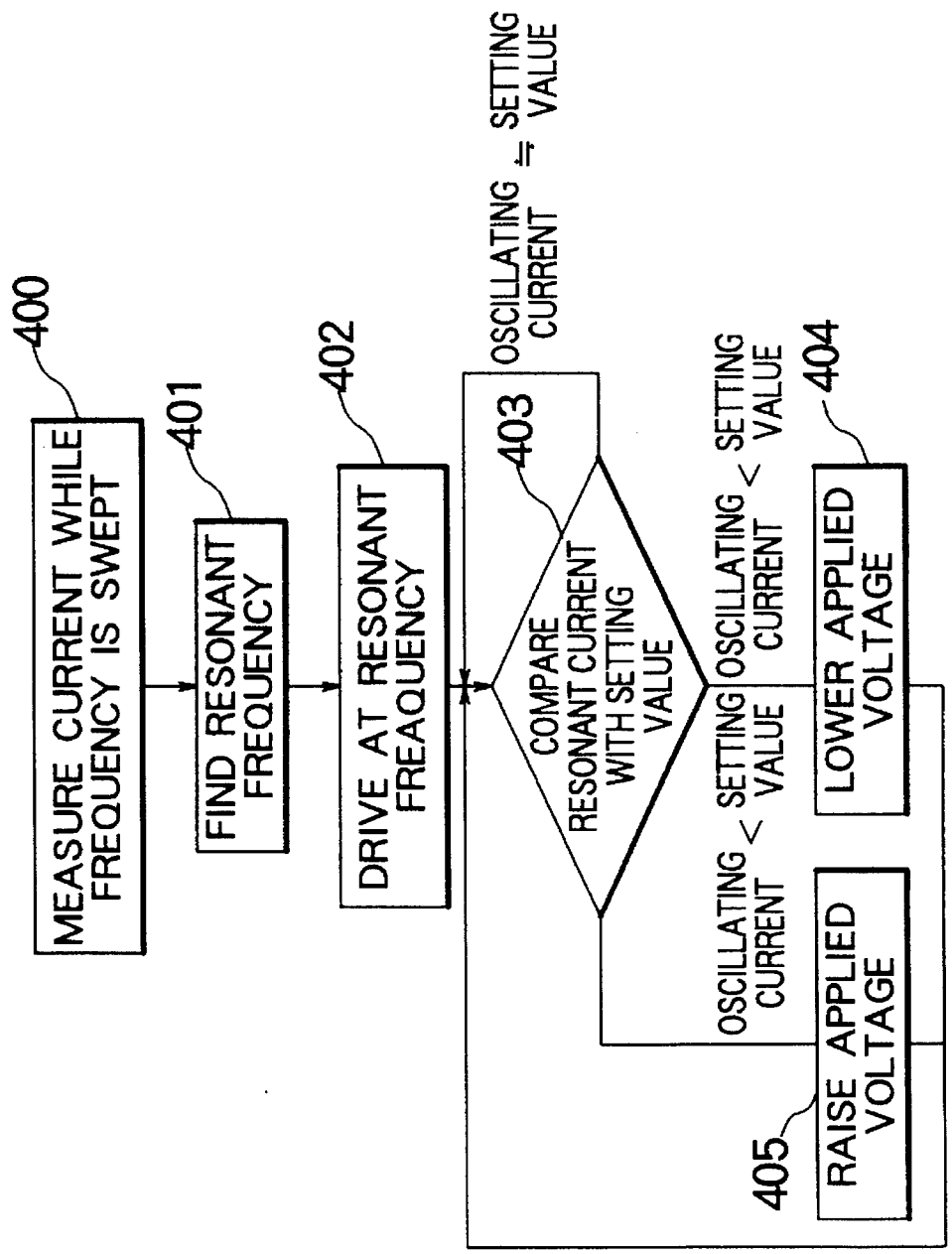
FIG. 4 is a flowchart showing a control flow achieved by the controller to drive the parts feeder at a resonant frequency and with a constant amplitude.
Figure 5:
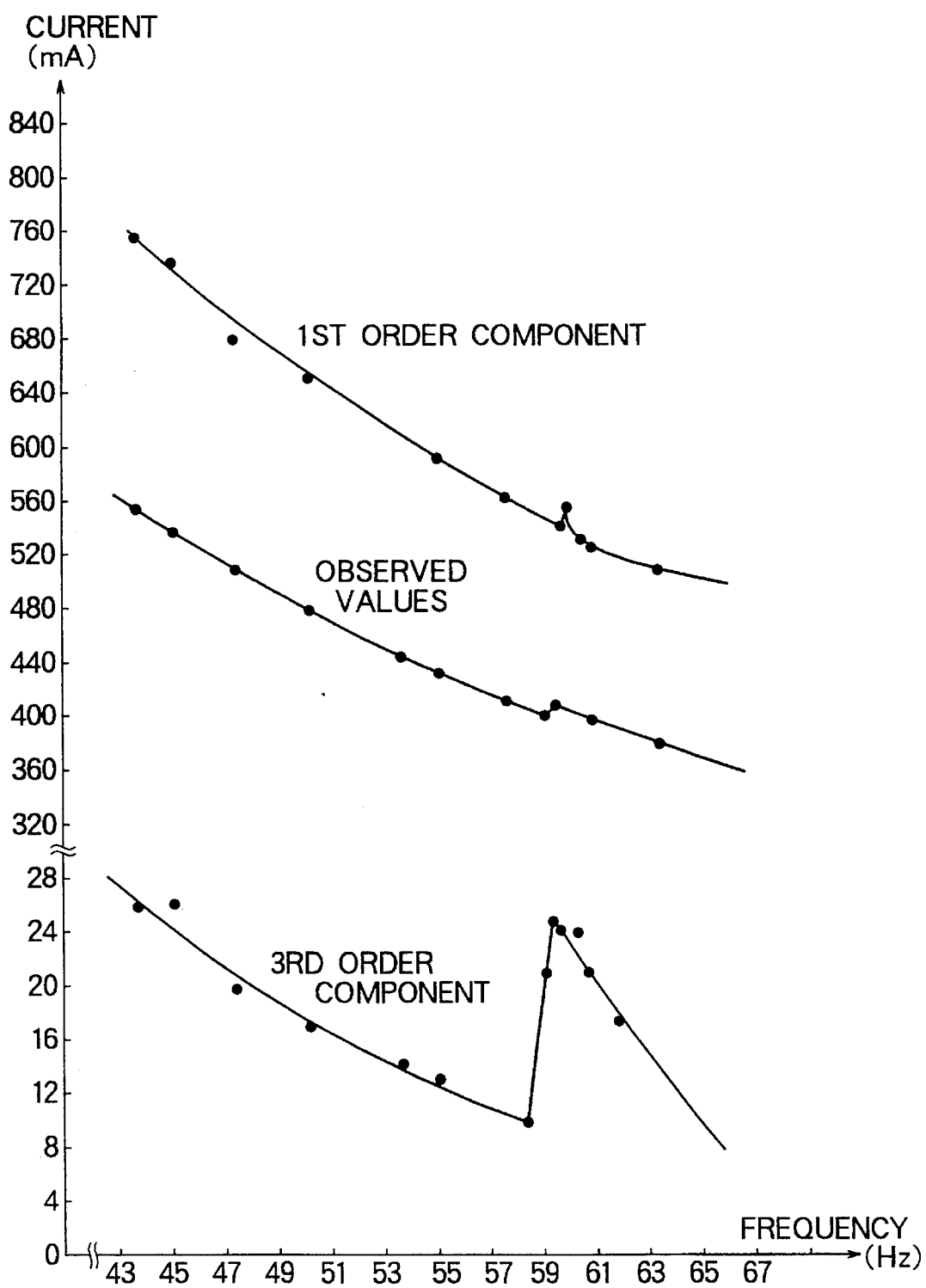
FIG. 5 is a graph of a characteristic curve showing the correlation between the current flowing through a coil of the electromagnetically vibrating parts feeder and the frequency.
Figure 6:
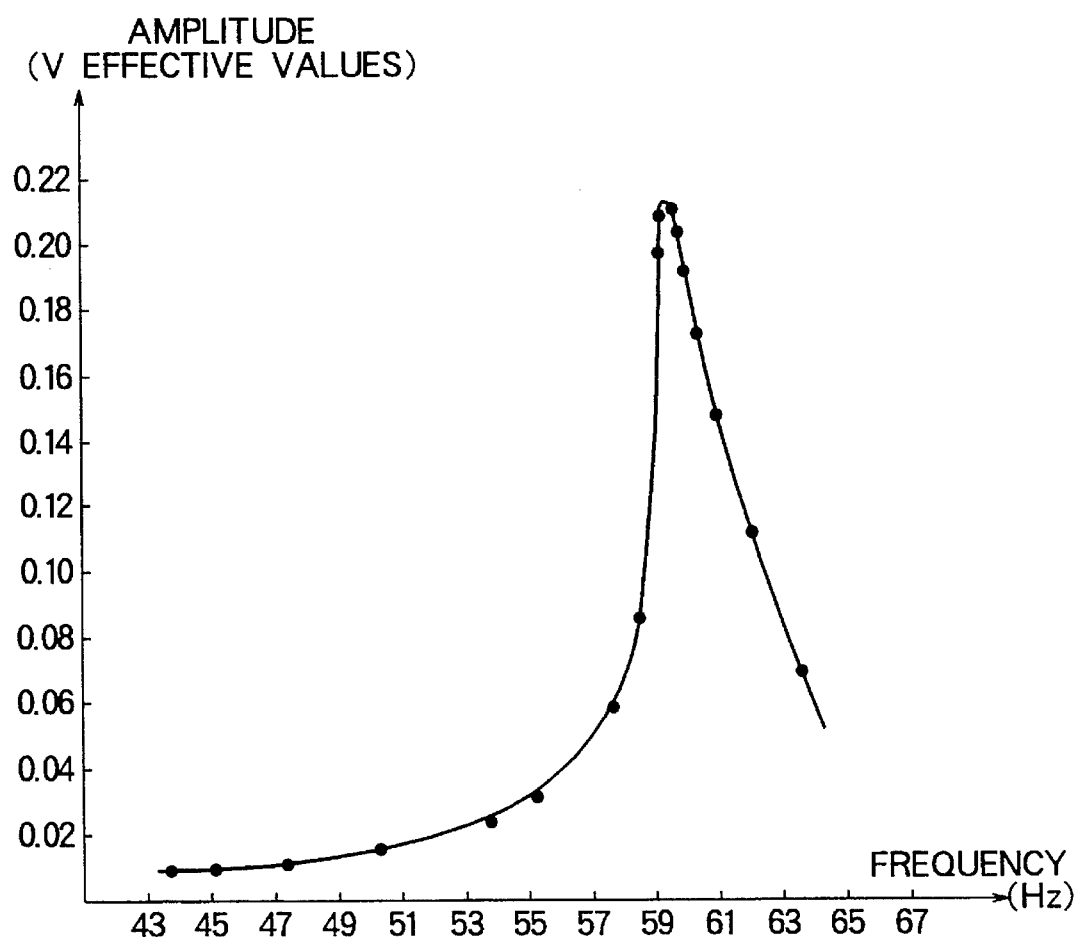
FIG. 6 is a graph of a characteristic curve showing the correslation between the amplitude and the frequency.
Figure 7:
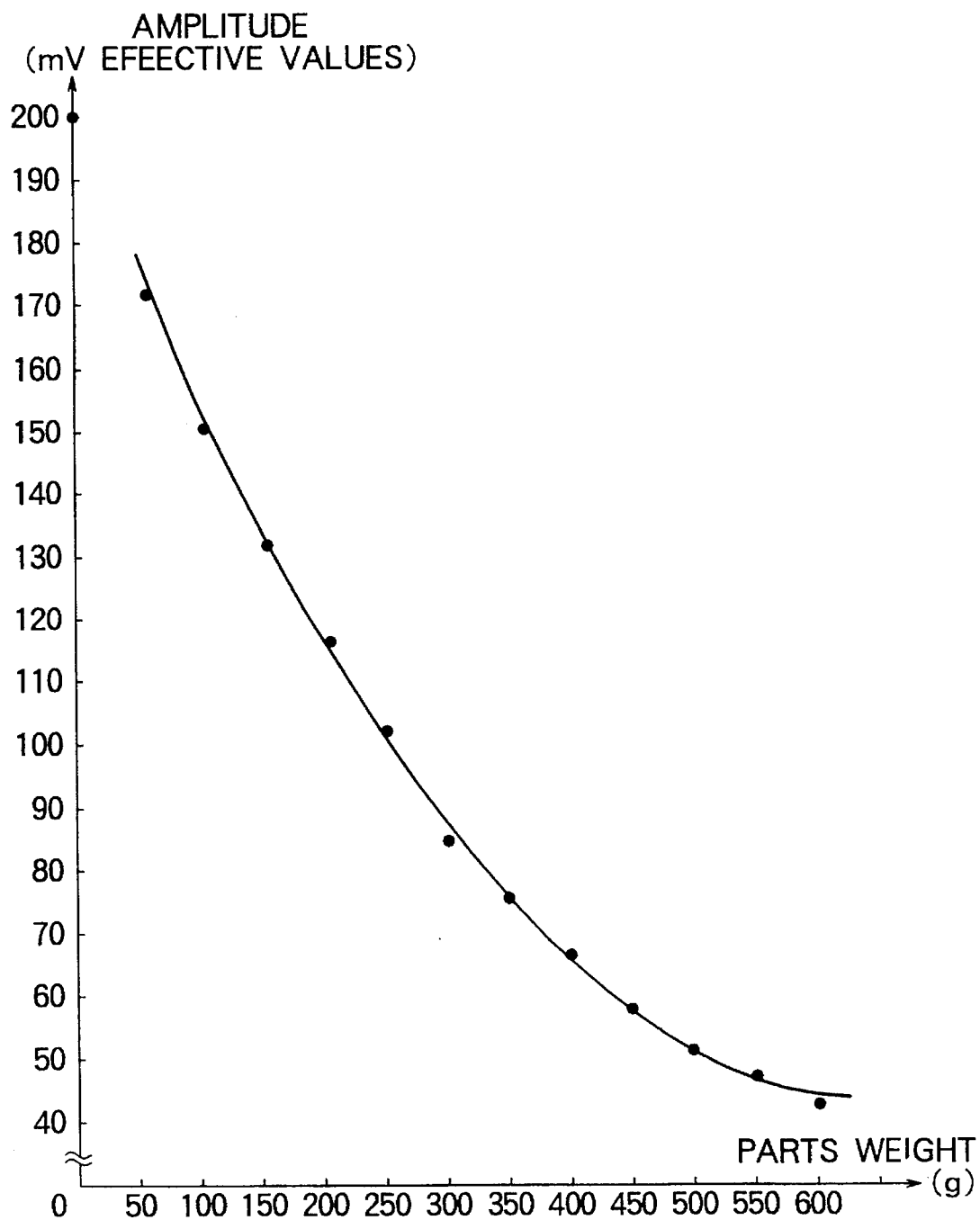
FIG. 7 is a graph of a characteristic curve showing the correlation between the amplitude and the weight of parts to be fed.
Figure 8:
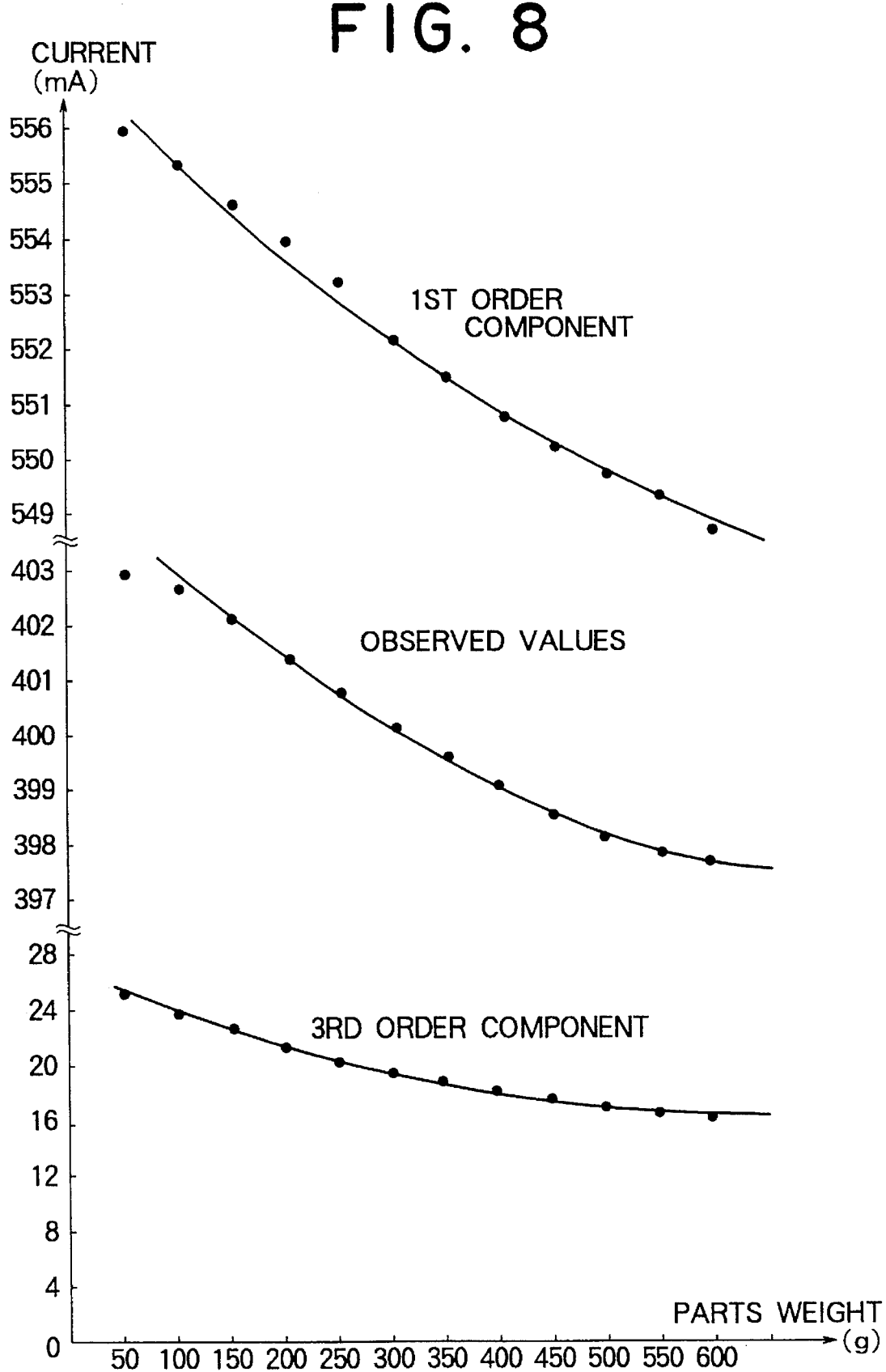
FIG. 8 is a graph of a characteristic curve showing the correlation between the current and the parts weight.
Figure 9:
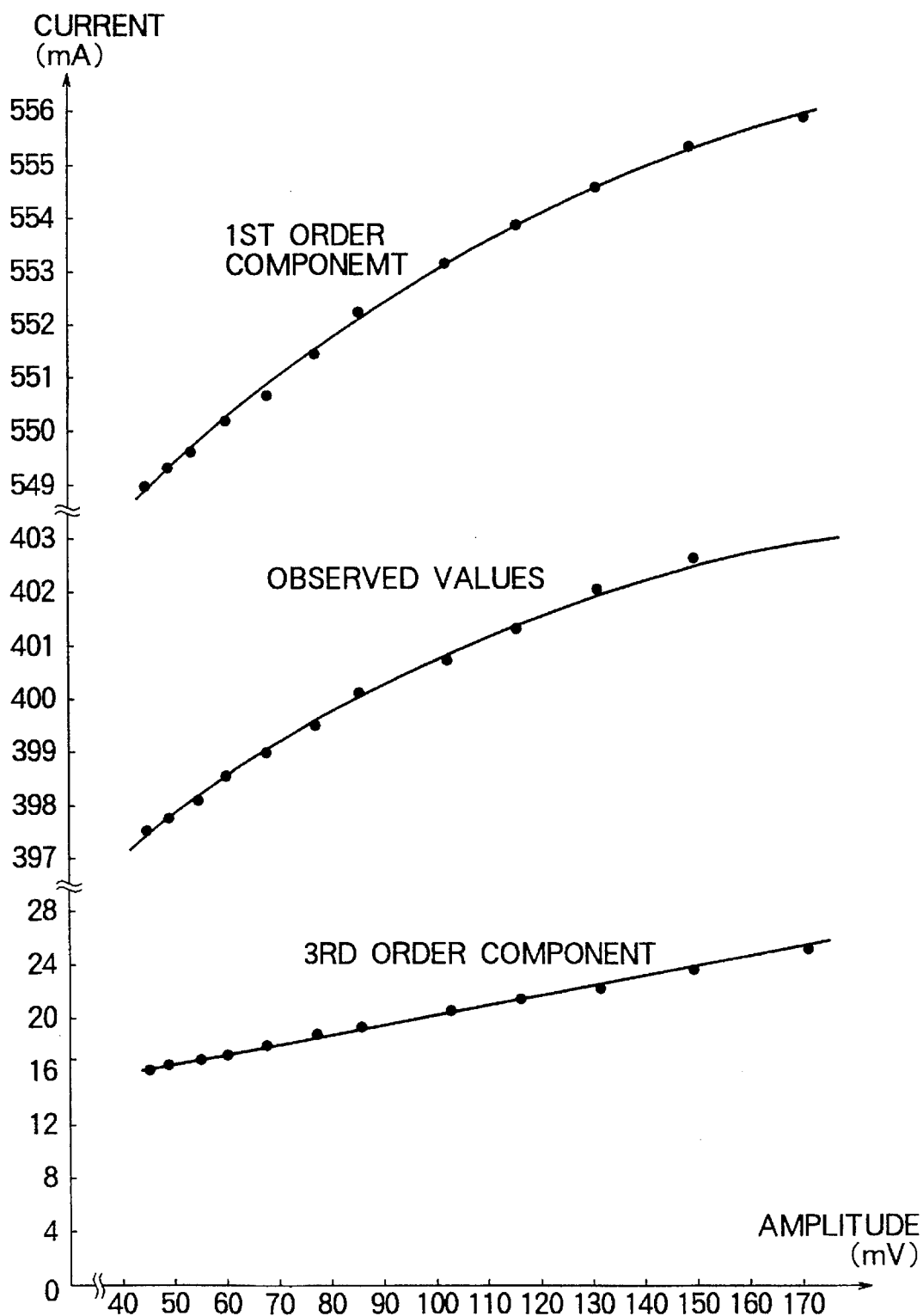
FIG. 9 is a graph of a characteristic curve showing the correlation between the current and the amplitude.
Figure 10:
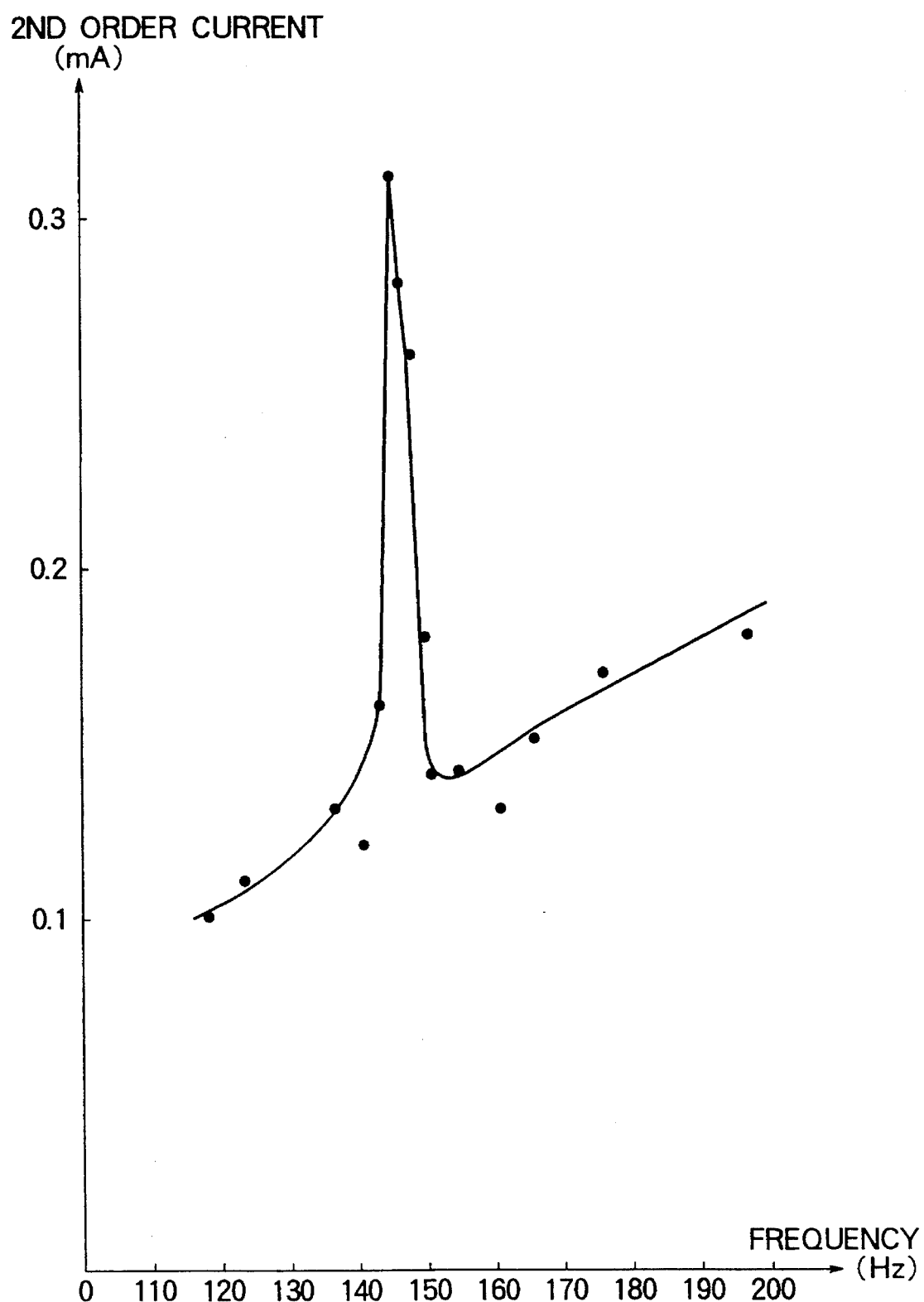
FIG. 10 is a graph of a characteristic curve showing the correlation between the current flowing through a coil of the piezoelectrically vibrating parts feeder and the frequency.
Figure 11:
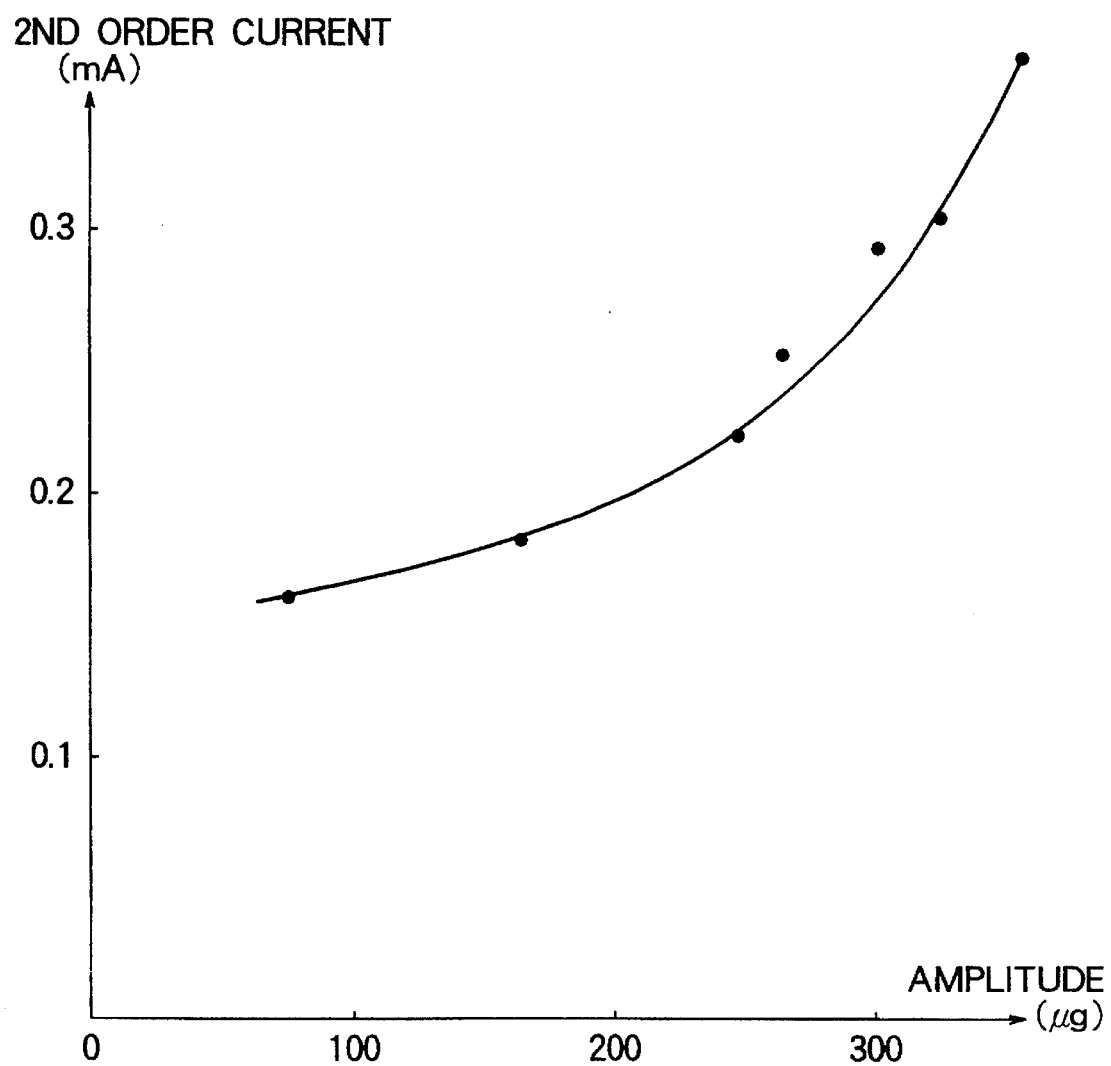
FIG. 11 is a graph of a characteristic curve showing the correlation between the current and the parts weight.
Figure 12:
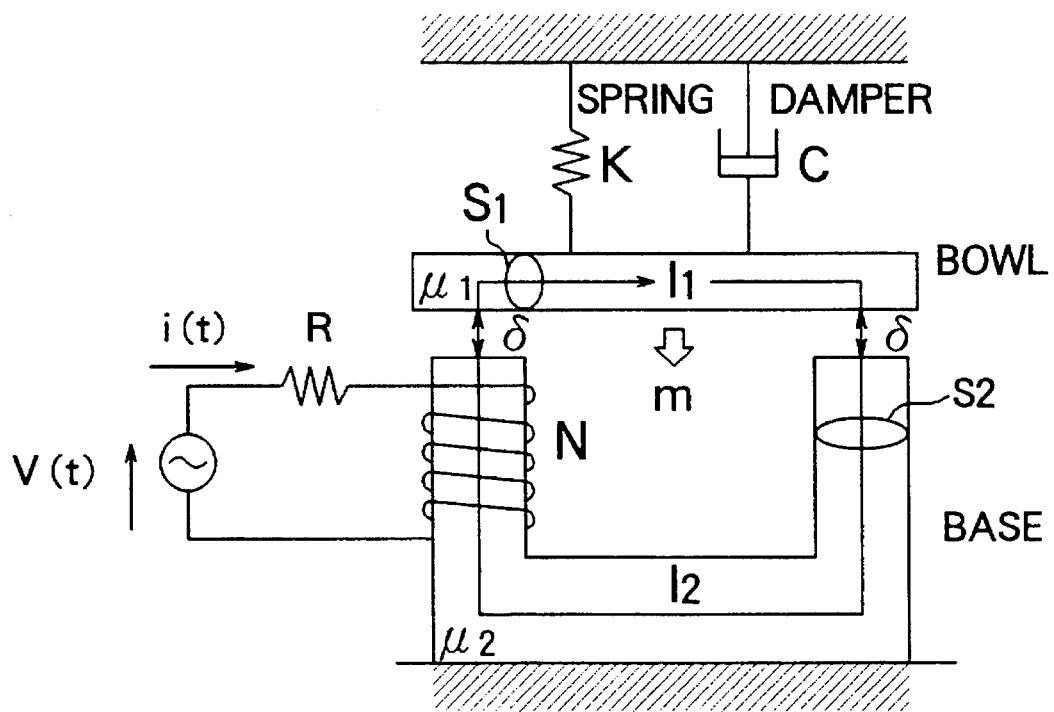
FIG. 12 is a diagrammatical view showing a model of the electromagnetically vibrating parts feeder.
Figure 13:
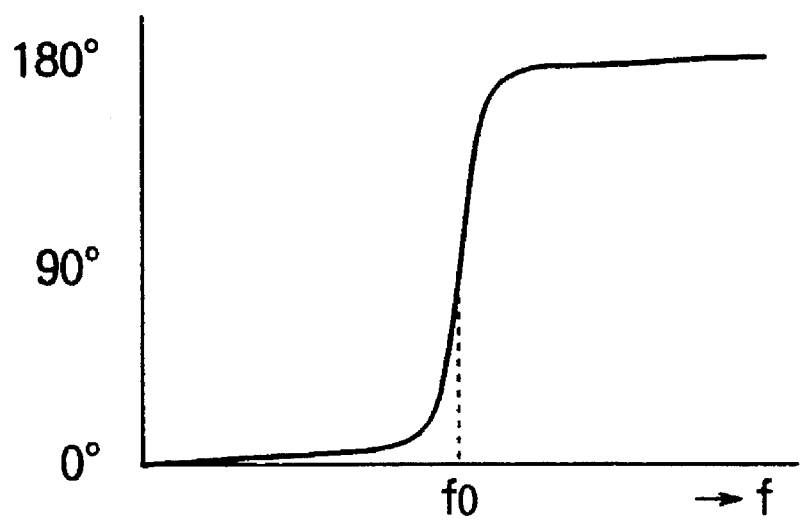
FIG. 13 is a graph showing a frequency characteristic curve illustrative of the phase lag of amplitude relative to the exciting force.
Figure 14:
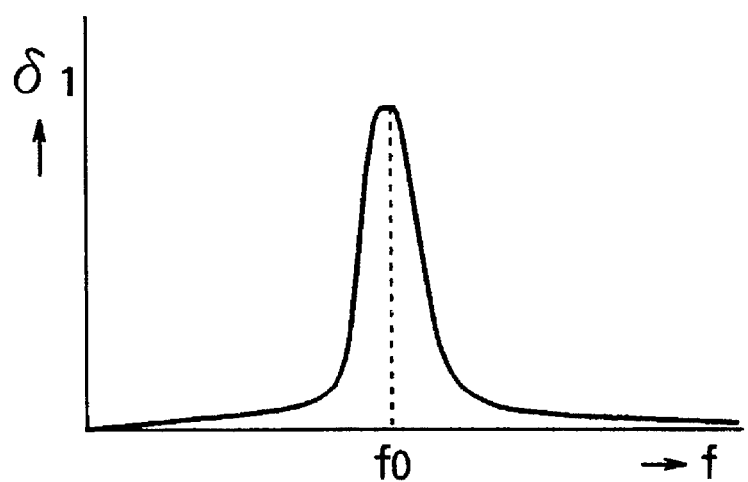
FIG. 14 is a graph showing a frequency characteristic curve of the amplitude.

Operation of the controller 10 which is achieved to determine a resonant frequency of the parts feeder will be described below with reference to the flowchart shown in FIG. 4. The parts feeder is driven by the power circuit 11. At the same time, the sweep signal generating circuit 20' of the oscillating current computer 17 varies the frequency through the predetermined range during which time a change in the current of high order which is caused by vibration of a mechanical system and which is delivered from the frequency analyzers 15, 16 is measured (a step 401) for finding out a maximum value of the current change (a step 402). When the maximum value of the current change is found, a command signal is fed to the frequency convertor 20 for driving the parts feeder at a frequency corresponding to the maximum value (a step 402). Upon receipt of the command signal, the frequency convertor 20 sends a command signal to the power circuit 11 to drive the parts feeder at the frequency specified above. Since this frequency is approximately the same as the natural frequency of the parts feeder, this means that the parts feeder is hereafter driven at a resonant frequency.

In the illustrated embodiment, a signal representing the high order current component caused by vibration of the parts feeder is computed by the oscillating current computer 17 and then delivered to the drive signal generator 19 as described above. The drive signal generator 19 also receives from the amplitude setter 18 a setting signal corresponding to the third order current value which is necessary to obtain a predetermined amplitude. The high order current component signal (oscillating current value) is compared with the setting signal (setting current value) to see whether or not the both current values are identical (a step 403). For this purpose, the drive signal generator 19 has a known comparator circuit. If the oscillating current value and the setting current value are identical, the drive of the parts feeder continues further. Conversely, if the oscillating current value and the setting current value are not identical, the frequency and amplitude of the applied voltage are controlled via the power transistor drive circuits 11d, 11e until the aforesaid two current values become identical (steps 404 and 405).

To this end, each of the power transistor drive circuits 11d, 11e contains a drive current controlling circuit (not shown). In the illustrated embodiment, the frequency of the applied voltage is controlled by varying the period t1 shown in FIG. 3, while the amplitude of the applied voltage is controlled by varying the width (time duration) t2. In order to keep the amplitude constant, the drive current controlling circuits incorporated in the respective power transistor drive circuits 11d, 11e are driven in accordance with the result of comparison achieved by the drive signal generator, so as to control the turn-on time of a base current supplied to the power transistors 11b, 11c. Since the exciting current applied to the parts feeder has a constant wave height, as shown in FIG. 3, a predetermined exciting current can readily be obtained by controlling the width t1. In the parts feeder of the type concerned, the correlation between the high order current component and the amplitude is linear, as described above. This means that a desired amplitude can be obtained by controlling the exciting current.

In the embodiment previously described, the parts feeder is driven at a resonant frequency and with a constant amplitude under the effect of a feed-back control. According to the embodiment, the resonant frequency is controlled in such a manner that the parts feeder is driven with a constant period t1 so long as the width t2 of the voltage waveform is not larger than one half of the period t1; and if the width t2 exceeds one half of the period t1, the sweep of the frequency is initiated again to drive the parts feeder with a new period t1.

The resonant frequency is controlled in the manner described below. The parts feeder is driven by the power circuit 11. Simultaneously therewith, the frequency is varied through a predetermined range by the sweep signal generating circuit of the oscillation current computer 17, and a change in the high order current which is caused by vibration of the mechanical system and which is delivered from each of the frequency analyzers 15, 16 is measured for finding out a maximum point or value of the current change. When the maximum value of the current change is found, a command signal is fed to the drive signal generator 19, thus driving the parts feeder at a frequency corresponding to the maximum value. Upon receipt of the command signal, the drive signal generator 19 activates its frequency converting circuit to drive the power transistors 11b, 11c at the frequency specified above. This frequency is an approximate value of the natural frequency which is peculiar to the parts feeder. Accordingly, the parts feeder is hereafter driven at a resonant frequency.

As appears clear from the foregoing description, according to the drive control method and apparatus of the invention, the frequency of a drive power supply of a parts feeder is swept, and a maximum value of a change in the current occurring during the sweep is detected. The parts feeder is then driven at a frequency corresponding to the detected maximum value. It is, therefore, no longer necessary to preset a natural frequency at the time of manufacture of the parts feeder. In addition, the correlation between the current, especially a harmonic component of the current resulting from vibration of a mechanical system of the parts feeder, and the amplitude is used in a feedback control achieved by an electronic circuit in the drive control apparatus, so that the amplitude can be controlled with high and accurate response to a change of the parts weight, without using a separate detector attached to the parts feeder. Yet, the drive control apparatus is not influenced very much by ambient conditions, is highly reliable in operation, is well adaptable to aging deterioration of the parts feeder, and brings about a substantial reduction of the manufacturing cost of the parts feeder.

Obviously, various minor changes and modifications of the present invention are possible in the light of the above teaching. It is therefore to be understood that within the scope of the appended claims the invention may be practiced otherwise than as specifically described.

What is claimed is:

1. A method of controlling the drive of a self-excited vibrating parts feeder which includes a parts feeder unit and a drive power supply for supplying an electric power of a desired frequency to a vibration generating unit to exert vibrations to the parts feeder unit, said method comprising the steps of:

(a) sweeping the voltage of the drive power supply through a predetermined frequency range;

(b) detecting a maximum value of a change in the current flowing through the vibration generating unit, while the voltage of the drive power supply is swept; and (c) driving the parts feeder with a frequency which generates said maximum value.

2. A method according to claim 1, further including a step of comparing a current varying within said predetermined frequency range with a predetermined current, and a step of controlling a drive current of the drive power supply so that said varying current and said predetermined current are identical, thereby controlling the amplitude of vibration of the parts feeder.

3. A method according to claim 1 or 2, wherein the vibration generating unit comprises an electromagnetic driving unit including an iron-core coil and an armature.

4. A method according to claim 1 or 2, wherein the vibration generating unit comprises a piezoelectric driving unit including a piezoelectric element.

5. A method according to claim 1 or 2, wherein said current from which said maximum value is detected is a harmonic component that results from vibration of a mechanical system of the parts feeder.

6. An apparatus for controlling the drive of an electromagnetic vibration parts feeder of the type including a parts feeder unit, an electromagnetic driving unit having an iron-core coil and an armature for exerting vibration to said parts feeder unit, and a drive power supply for supplying an electric power of a desired frequency to said electromagnetic driving unit, said apparatus comprising:

(a) a current detecting means for detecting a current flowing through said iron-core coil; and (b) a drive signal generating means for sweeping the voltage of said drive power supply through a predetermined frequency range, detecting a change in the current flowing through said iron-core coil while the voltage of said drive power supply is swept, determining a frequency corresponding to a maximum value of the current change, and driving said drive power supply at the thus-determined frequency.

7. An apparatus according to claim 6, further including an oscillating current computing means for computing, by comparison, the difference between the value of the current detected by said current detecting means and the value of a preset current signal which is previously set to produce a predetermined amplitude, and an exciting current driving means for controlling a driving current of said drive power supply according to the result of said computation so that the value of said detected current and the value of said preset current signal are identical.

8. An apparatus according to claim 6, further including a harmonic analyzing means, disposed between said current detecting means and said drive signal generating means, for separating the current detected by said current detecting means into components of different frequencies and inputting to said drive signal generating means a current signal including a harmonic component that results from vibration of the parts feeder.

9. An apparatus according to claim 7, further including a sampling measurement means, disposed between said current detecting means and said harmonic analyzing means, for sampling the current detected by said current detecting means at predetermined intervals of time and sending the sampled current to said harmonic analyzing means.

10. An apparatus according to claim 7, further including a sampling measurement means, disposed between said current detecting means and said harmonic analyzing means, for sampling the current detected by said current detecting means at predetermined intervals of time and sending the sampled current to said harmonic analyzing means.

11. An apparatus for controlling the drive of a piezoelectric vibrating parts feeder at a resonance frequency, of the type including a parts feeder unit, a piezoelectric driving unit having a piezoelectric element for exerting vibration to said parts feeder unit, and a driving power supply for supplying an electric power of a desired frequency to said piezoelectric driving unit, said apparatus comprising:

(a) a current detecting means for detecting a current flowing through said piezoelectric element; and (b) a drive signal generating means for sweeping the voltage of said drive power supply through a predetermined frequency range, detecting a change in the current flowing through said piezoelectric element while the voltage of said drive power supply is swept, determining a frequency corresponding to a maximum value of the current change, and driving said drive power supply at the thus-determined frequency.

12. An apparatus according to claim 11, further including an oscillating current computing means for computing, by comparison, the difference between the value of the current detected by said current detecting means and the value of a preset current signal which is previously set to produce a predetermined amplitude, and an exciting current driving means for controlling a driving current of said drive power supply according to the result of said computation so that the value of said detected current and the value of said preset current signal are identical.

13. An apparatus according to claim 11 or 12, further including a harmonic analyzing means, disposed between said current detecting means and said drive signal generating means, for separating the current detected by said current detecting means into components of different frequencies and inputting to said drive signal generating means a current signal including a harmonic component that results from vibration of the parts feeder.

* * * * *